United States Patent [19]
Hong

[11] Patent Number: 5,903,301
[45] Date of Patent: May 11, 1999

[54] APPARATUS FOR REMOVING UNNECESSARY DATA IN COMMUNICATION NETWORK

[75] Inventor: Kwang Sun Hong, Suwon-si, Rep. of Korea

[73] Assignee: Samsung Electro-Mechanics Co., Ltd., Suwon, Rep. of Korea

[21] Appl. No.: 08/735,029

[22] Filed: Oct. 22, 1996

[30] Foreign Application Priority Data

May 10, 1996 [KR] Rep. of Korea ............ 1996-15428

[51] Int. Cl.⁶ .................. H04N 7/10; H04N 17/00
[52] U.S. Cl. .................. 348/10; 348/180; 348/192; 371/20.1
[58] Field of Search ............ 371/20.1, 37.01, 371/37.7; 370/242, 252; 348/10, 180, 192, 725

[56] References Cited

U.S. PATENT DOCUMENTS

| | | | |
|---|---|---|---|
| 3,826,908 | 7/1974 | Weathers | 235/153 |
| 4,710,929 | 12/1987 | Kelly | 371/22 |
| 4,787,085 | 11/1988 | Suto | 370/110.1 |
| 4,794,602 | 12/1988 | Tanaka | 371/37 |
| 5,097,469 | 3/1992 | Douglas | 371/20.1 |
| 5,548,598 | 8/1996 | Dupont | 371/35 |
| 5,574,495 | 11/1996 | Caporizzo | 348/13 |

FOREIGN PATENT DOCUMENTS 4-63579  10/1992  Japan .

*Primary Examiner*—Andrew I. Faile
*Assistant Examiner*—Mark W. Hrozenchik
*Attorney, Agent, or Firm*—Ladas & Parry

[57] ABSTRACT

An apparatus for removing unnecessary data in communication networks and used in a television transmitting and receiving devices of a cable television system and the like is disclosed. In a television receiving device capable of carrying out data communications, if an unnecessary data such as an address change command is contained in the data stream transmitted from the transmitting device to the receiving device, the unnecessary data is removed in advance. That is, in the present invention, if an unnecessary data is contained in a command, then a CRC error is forcibly generated, so that the receiving device can ignore a data stream containing the unnecessary data, thereby removing unnecessary data. In this manner, the damages to the software or hardware of the receiving device can be prevented.

14 Claims, 6 Drawing Sheets

| flag | address | command | data | CRC |
|---|---|---|---|---|
| 1 byte | 2 bytes | 1 byte | 16 bytes | 2 bytes |

Data format(22 total bytes)

APPARATUS FOR REMOVING UNNECESSARY DATA IN COMMUNICATION NETWORK

BACKGROUND OF THE INVENTION

1. Field of the Invention

The present invention relates to an apparatus for removing unnecessary data in communication networks, which is used in a television transmitting and receiving devices of a cable television system and the like. In particular, the present invention relates to an apparatus for removing unnecessary data in communication networks, which, in a television data transmitting and receiving devices for carrying out data communication, undesired and unnecessary data such as a command for change of an address loaded in a data stream transmitted from a transmitting end to a receiving end are detected, and the cyclic redundancy check is changed, so that the receiving device can ignore the data stream, thereby removing the unnecessary data.

2. Description of the Prior Art

Transmitting and receiving devices for a conventional cable television broadcasting system are illustrated in FIG. 1. Referring to FIG. 1, a transmitting device 100 of a broadcasting station transmits data streams in block units. Then the transmitted data streams are sent through a network amplifier 150 to a cable television receiving device 200.

A data stream which is transmitted from the transmitting device of a broadcasting station is constituted as shown in FIG. 2. That is, its format is: 1 byte of flag, 2 bytes of address, 1 byte of command, 16 bytes of data, and 2 bytes of cyclic redundancy check (CRC). That is, the data streams are transmitted in such a sequence in block units.

In the case where the CRC of the transmitting data stream is normal, the cable television receiving device 200 processes the received data in the normal manner. On the other hand, in the case where a CRC error has occurred, the received data are ignored.

In this conventional system, in the case where a command which is not wanted by the cable television receiving device 200 is present in the data stream which are transmitted by the transmitting device 100 of the broadcasting station, that is, in the case where an address change command or the like is received to the receiving device 200, the internal programs and system of the cable television receiving device 200 cannot operate in the normal manner. Not only so, but a serious damage can be inflicted to the expensive software or hardware.

FIG. 3 is a block diagram showing the constitution of another conventional address data correcting apparatus which is disclosed in Japanese Patent Publication No Hei-4-63579.

Referring to FIG. 3, this address data correcting apparatus operates in the following manner. That is, a data transmitting device transmits data having address data which have a certain number of differences between the continuous address data of the digital data which are transmitted in block units. For these transmitted data, the receiving end synchronizes a plurality of the received address data. Then differences between the synchronized continuous address data are detected. Then the detected differences and the mentioned certain number are compared to form block signals which display the presence or absence of errors. In the case of presence of an error, of the correct address data indicated by a flag among the plurality of the address data, there is calculated the time lag value on the address data which is closest to the erroneous data in time, thereby correcting the error.

In this conventional address data correcting apparatus, data errors are detected and corrected without carrying out the encoding for detecting and correcting errors. However, there is no feature of checking unnecessary data for the command data. Therefore, even if an address is duly corrected, if an address change command is transmitted, the system address of the receiving end as well as the transmitting address is changed, resulting in that a fatal damage is inflicted to the hardware or software

SUMMARY OF THE INVENTION

The present invention is intended to overcome the above described disadvantages of the conventional techniques.

Therefore it is an object of the present invention to provide an apparatus for removing unnecessary data in communication networks, in which, in a television receiving apparatus carrying out data communications, unnecessary data such as an address change command and the like contained in the transmitted data from a transmitting end to a receiving end are detected, and the CRC is altered so as to make the receiving device ignore-the relevant data stream, thereby removing the unnecessary data.

It is another object of the present invention to provide an apparatus for removing unnecessary data in communication networks, in which, by removing the unnecessary data, the components of the receiving data (such as hardware and software) are protected.

In achieving the above objects, the apparatus for removing unnecessary data in communication networks according to the present invention includes, a transmitting device of a broadcasting station including a data outputting device for outputting broadcasting signals, and a transmitting modem for modulating the broadcasting signals so as to output the modulated signals to a transmission line; a network amplifier installed on the transmission line, for amplifying the signals of the transmitting device of the broadcasting station; and a cable television receiving device including a receiving end modem for demodulating the signals received through the network amplifier, and a receiving device for processing the demodulated signals into television signals. The apparatus for removing unnecessary data further includes: a demodulating modem for demodulating the data stream received through the network amplifier so as to send them to a micro-computer; the micro-computer checking commands and data of the data stream from the modem so as to output a jam control signal upon encountering an unnecessary data, re-issuing another jam control signal after issuing the first jam control signal upon encountering a non-removal of the unnecessary data, and repeating the removal of unnecessary data from the next data stream upon finding a removal of the preceding unnecessary data; a wave pattern generator for generating clock signals of a certain frequency so as to send them to a first input terminal of a first logic arithmetic section; the first logic arithmetic section logic-summing the jam control signal of the micro-computer and the clock signal of the wave pattern generator; and a second logic arithmetic section for logic-multiplying an output of the first logic arithmetic section by an output of the data outputting device of the transmitting device of a broadcasting station.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

In the attached drawings, the elements having the same constitutions will be assigned with the same reference codes.

Figures 1, 2:
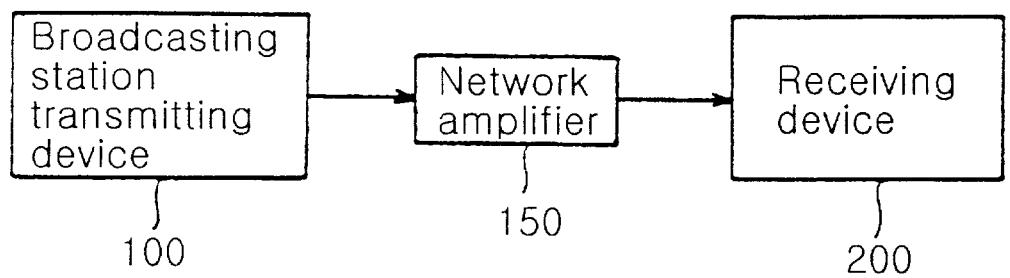
FIG. 1 is a block diagram showing the constitution of the transmitting and receiving devices of a conventional cable television.
FIG. 2 illustrates the format of a data stream transmitted from the transmitting device of a broadcasting station as a part of FIG. 1.
Figure 3:
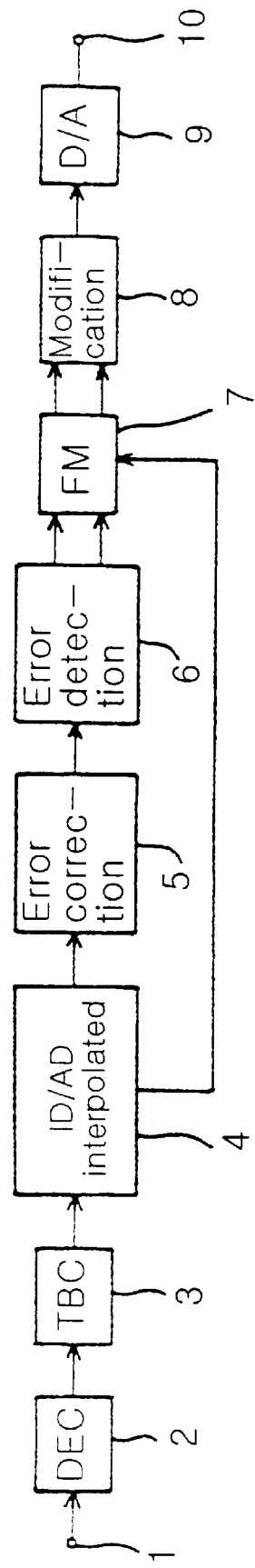
FIG. 3 is a block diagram showing the constitution of an address data correcting apparatus of another conventional system.
Figure 4:
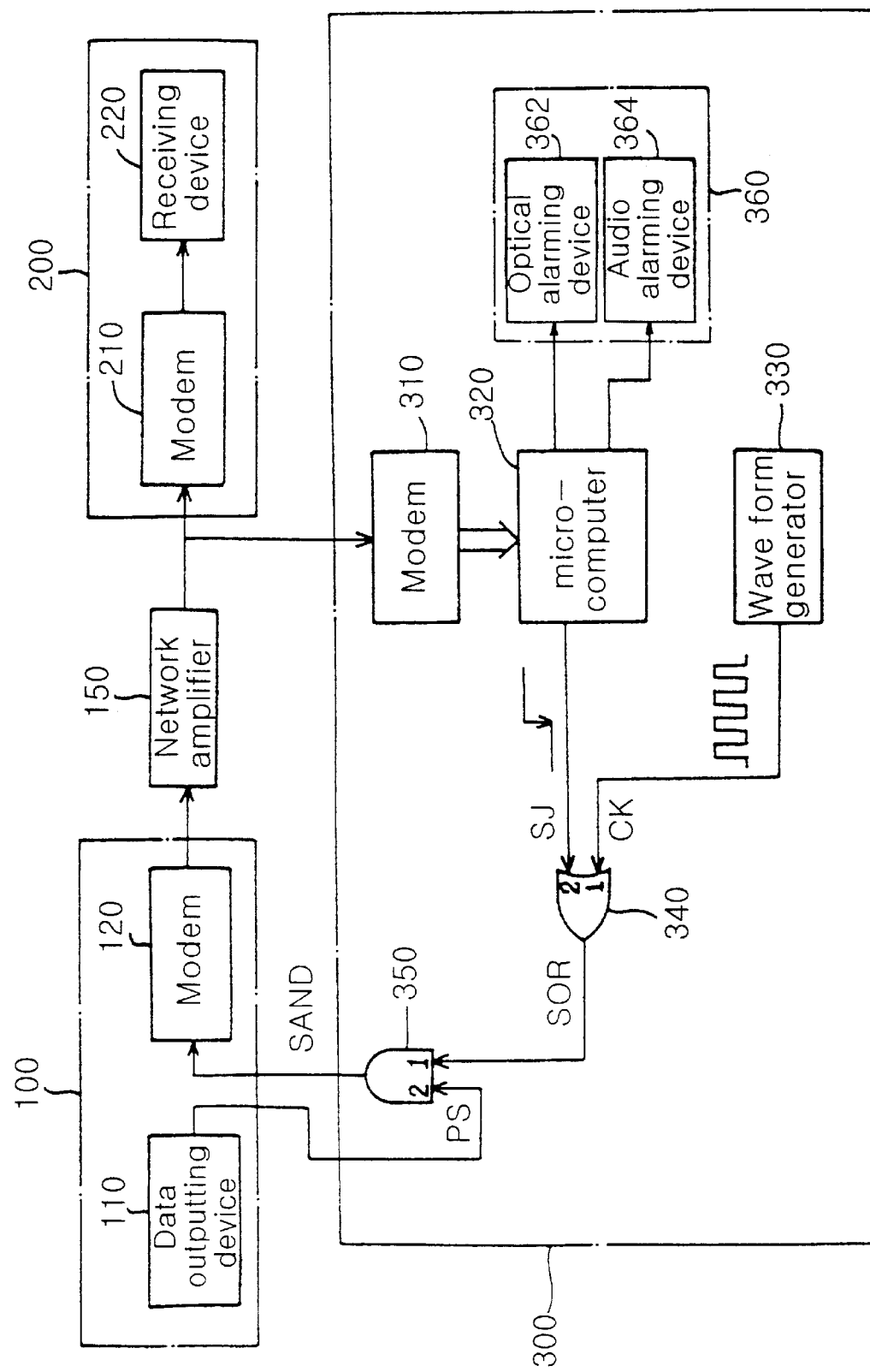
FIG. 4 is a partly circuital block diagram showing the constitution of the apparatus for removing unnecessary data according to the present invention.
Figure 5:
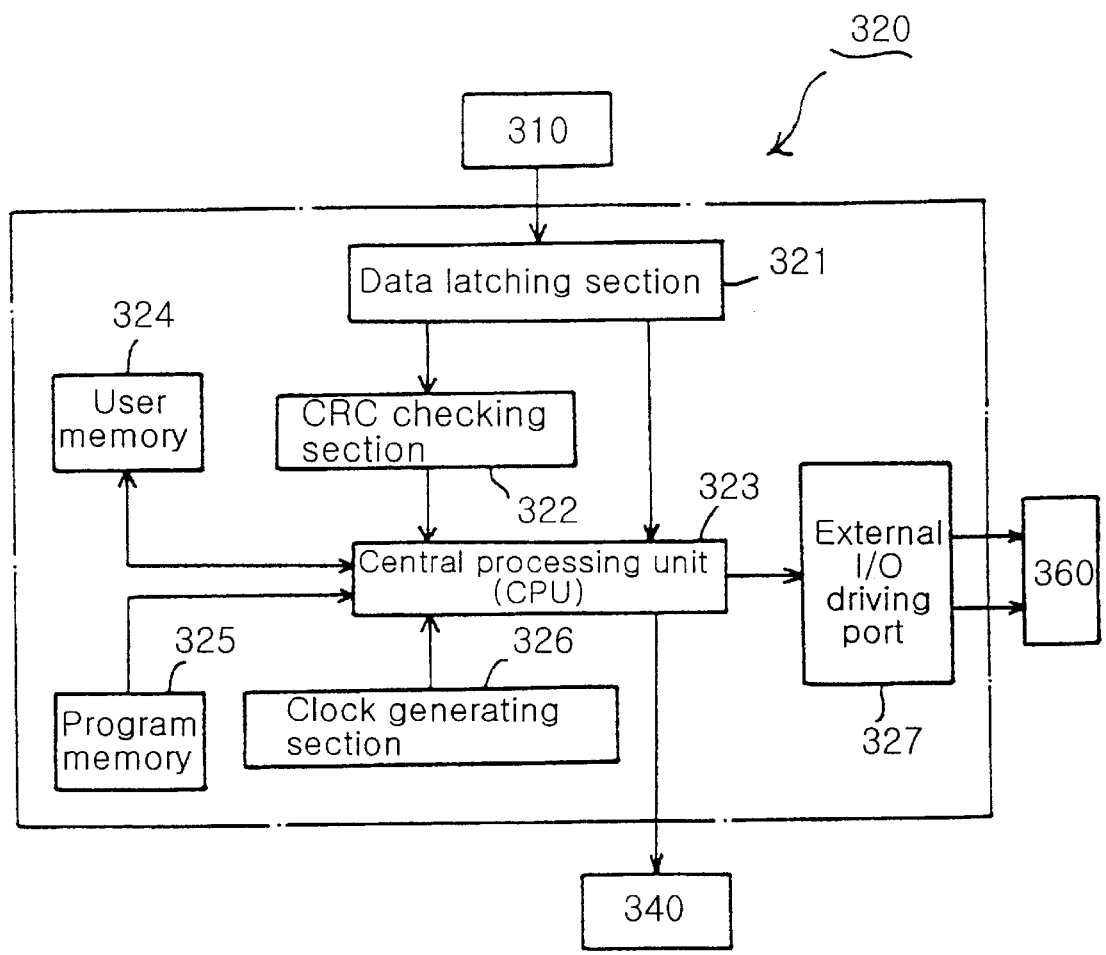
FIG. 5 illustrates the internal constitution of the microprocessor.

FIG. 4 is a partly circuital block diagram showing the constitution of the apparatus for removing unnecessary data according to the present invention. FIG. 5 illustrates the internal constitution of a micro-processor of FIG. 4.

Referring to FIG. 4, the apparatus for removing unnecessary data in communication networks according to the present invention includes, a transmitting device 100 of a broadcasting station including a data outputting device 110 and a modem 120; a network amplifier 150 installed on the transmission line, for amplifying the signals from the transmitting device 100 of the broadcasting station; a cable television receiving device 200 for receiving data streams through the network amplifier 150, and including a receiving device for processing the demodulated signals into television signals; and an unnecessary data removing device 300 for checking the data from the transmitting device 100 of a broadcasting station, and for furnishing a jam control signal to the receiving device 200 so as to induce CRC error upon encountering an unnecessary data.

The unnecessary data removing device 300 includes: a demodulating modem 310 for demodulating the data stream received through the network amplifier 150 so as to send them to a micro-computer 320; the micro-computer 320 checking commands and data of the data stream from the modem 310 so as to output a jam control signal upon encountering an unnecessary data, re-issuing another jam control signal after issuing the first jam control signal upon encountering a non-removal of the unnecessary data, and repeating the removal of unnecessary data from the next data stream upon finding a removal of the preceding unnecessary data; a wave form generator 330 for generating clock signals of a certain frequency so as to send them to a first input terminal of a first logic arithmetic section 340; the first logic arithmetic section 340 logic-summing the jam control signal of the micro-computer 320 and the clock signal of the wave form generator; and a second logic arithmetic section 350 for logic-multiplying an output of the first logic arithmetic section 340 by an output of the data outputting device 110 of the transmitting device 100 of a broadcasting station so as to output the product to the modem 120 of the transmitting device 100 of a broadcasting station.

The micro-computer 320 outputs an alarm driving signal when an unnecessary data is removed. Therefore, the micro-computer 320 further includes an alarming device 360 which generates an alarm, alarming that an unnecessary data has been removed. The alarming device 360 includes an optical alarming device 362 and/or an audio alarming device 364. The optical alarming device 362 may consists of a lamp or a light emitting diode (LED), while the audio alarming device 364 may consists of a buzzer or a speaker.

The first logic arithmetic section 340 consists of an OR gate, while the second logic arithmetic section 350 consists of an AND gate. The signals from the wave form generator 326 have a frequency higher than the frequency of the output signals of the data outputting device 110 of the transmitting device 100 of the broadcasting station. Preferably, the signals from the wave form generator 326 should have a frequency twice as high as that of the frequency of output signals of the data outputting device 110 of the transmitting device 100.

Referring to FIG. 5, the micro-computer 320 includes: a data latching section 321 for latching and outputting a data from the demodulating modem 310 to a CRC checking section 322 and to a central processing unit 323; the CRC checking section 322 checking an existence of a CRC error based on a data of the data latching section 321, and then, transmitting the checked result to the central processing unit 323; a program memory 325 for storing a system managing program and an unnecessary data removing program; a user memory 324 for storing a data needed during an execution of the program and a data generated during an execution of the program; a clock generating section 326 for generating clocks to supply them to the central processing unit 323; the central processing unit 323 executing the programs stored in the program memory so as to judge as to a presence or absence of an unnecessary data in accordance with commands and data of the data latching section 321, then issuing a jam control signal upon finding a presence of an unnecessary data, then judging as to whether the unnecessary data has been removed in accordance with a result of a CRC error checking, and then outputting an alarm driving signal to an external I/O driving port 327 upon finding the removal; and the external I/O driving port 327 supplying the alarm driving signal of the central processing unit 323 to an external alarming device 360.

The program memory consists of a ROM, while the user memory consists of a RAM.

Figure 6:
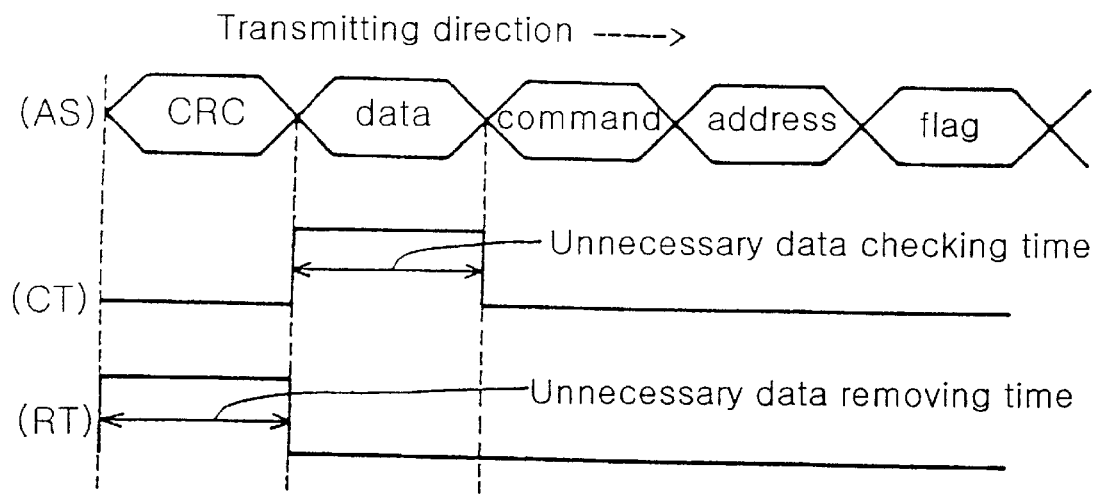
FIG. 6 is a timing chart showing the signal processing in the present invention.
Figure 7:
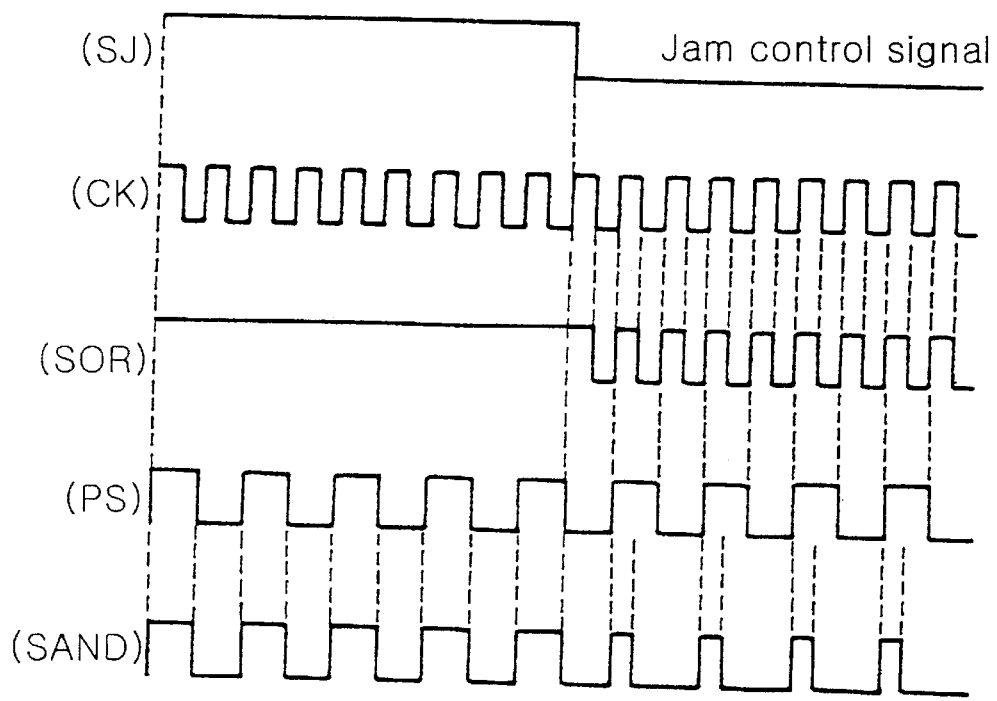
FIG. 7 is a timing chart showing the principal signals of the present invention.
Figure 8:
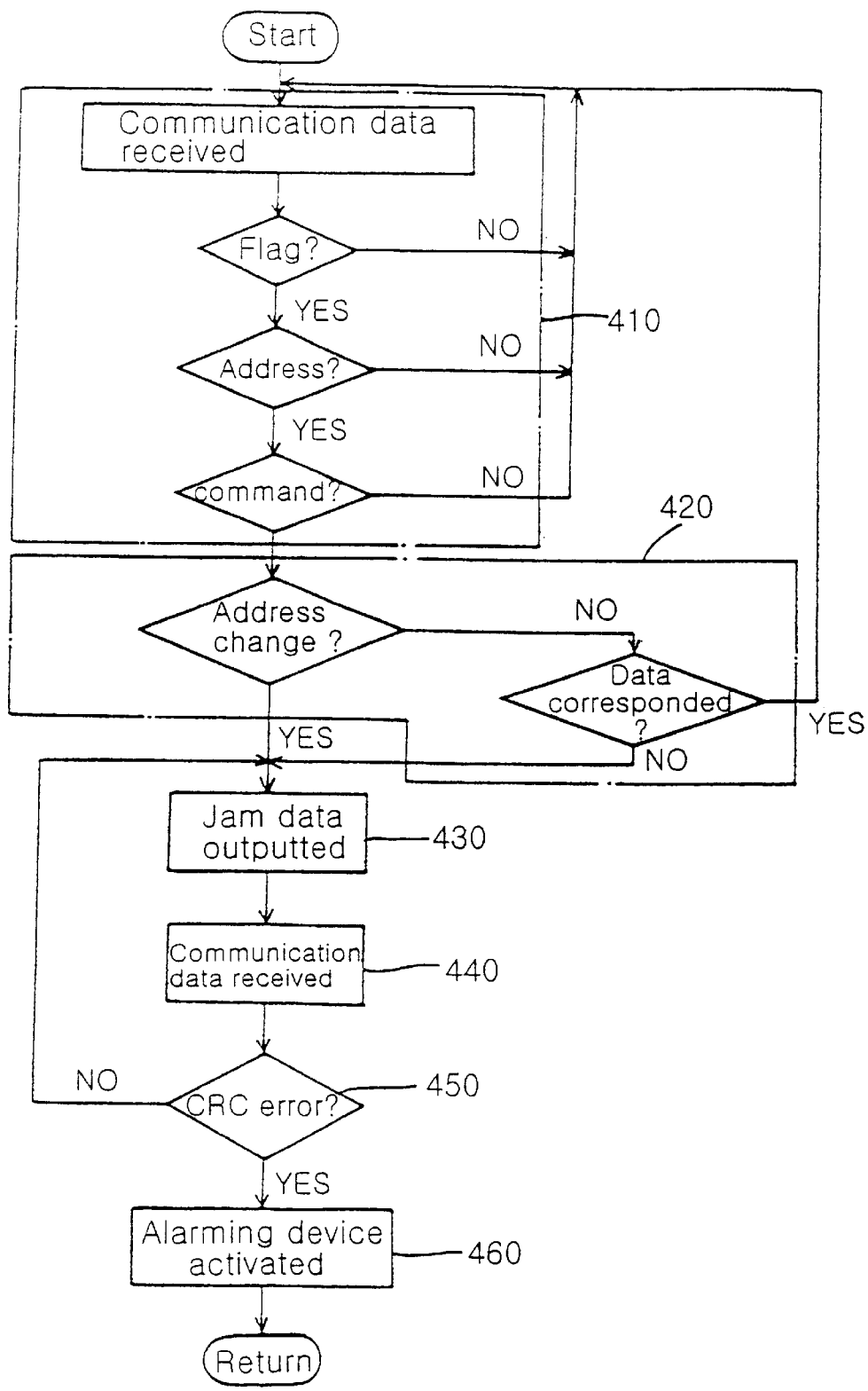
FIG. 8 is a flow chart showing the operation of the present invention.

FIG. 6 is a timing chart showing the signal processing in the present invention. FIG. 7 is a timing chart showing the principal signals of the present invention. FIG. 8 is a flow chart showing the operation of the present invention.

Now the apparatus of the present invention constituted as above will be described referring to the attached drawings.

That is, present invention will be described referring to FIGS. 4 to 8. First, before unnecessary data are checked, the micro-processor 320 of the unnecessary data removing device 300 of FIG. 4 generates a jam control signal SJ with a high level. Therefore, the output of the first logic arithmetic section 340 (consisting of an OR gate) also comes to have a high level. This high level signal is supplied to a first input terminal of the second logic arithmetic section 350 which consists of an AND gate. Therefore, the second logic arithmetic section 350 supplies the signals of its second input terminal to the transmitting modem 120 as they are.

Before the unnecessary data are checked, the data outputting device 110 of the transmitting device 100 of the broadcasting station outputs signal PS of a certain frequency containing a broadcasting information. The signals PS are sent through the second logic arithmetic section 350 of the unnecessary data removing device 300 to the transmitting modem 120. The modem 120 modulates the received signals, and then, the modulated signals are amplified by the network amplifier 150. Then data streams DS of block units which are as shown in FIG. 6 are transmitted to the television receiving device 200. At the same time, the data streams DS are supplied also to the unnecessary data removing device 300. The operation of the unnecessary data removing device 300 will be described below.

Referring to FIG. 5, the unnecessary data removing device 300 operates in the following manner. That is, the demodulating modem 310 demodulates the inputted signals DS so as to send them to the micro-processor 320. The data latching section 321 of the micro-processor 320 of FIG. 5 latches the inputted data so as to send them both to the CRC checking section 322 and to the central processing unit 323. The CRC checking section 322 checks CRC errors so as to send the checked result to the central processing unit 323. At the clock speed of the clock generating section 326 and in accordance with the system program and the unnecessary data removing program of the program memory 325, a judgment is made as to whether there is an address change command in the data stream DS or whether there is a non-correspondence between the command signal and the data (steps 410 and 420 of FIG. 8). If an unnecessary data is present, a low level jam control signal SJ is outputted to the first logic arithmetic section 340 as shown in FIG. 7 (step 430 of FIG. 8).

Now referring to FIG. 6, the timing relationship during the data processing by the unnecessary data removing device 300 will be described. The data stream DS is transmitted to the unnecessary data removing device 300 in the sequence illustrated in FIG. 6. Then at the step 410 of FIG. 8, the unnecessary data removing device 300 receives a flag, and an address and a command. Then an unnecessary data checking time CT for checking on an address change command and on the correspondence between the command and the data is set to before a time point when the CRC is transmitted. An unnecessary data removing time RT for removing the unnecessary data upon finding an unnecessary data during the checking time CT is set to a time interval when the CRC is transmitted. That is, this unnecessary data removing time RT is set to before the completion of the CRC transmission.

Referring to FIG. 7, the first logic arithmetic section 340 logic-sums the low level jam signal SJ of the micro-processor 320 and the clock pulse CK of the wave form generator 330 so as to supply the logic-summed signals SOR (having the wave form outputted from the wave form generator) to the first input terminal of the second logic arithmetic section 350.

Meanwhile, the wave form generator 330 of the unnecessary data removing device 300 continuously outputs pulse streams having a certain duty ratio. If the unnecessary data removing operation is to be efficiently carried out, the signals from the wave form generator 330 should have a frequency higher than that of the output signals of the data outputting device 110 of the transmitting device 100 of the broadcasting station. Preferably, the frequency of the former should be twice as high as that of the latter.

The second logic arithmetic section 350 logic-multiplies the output signals SOR of the first logic arithmetic section 340 by the signals PS of the data outputting device 110 of the transmitting device 100 of the broadcasting station, so as to output altered signals SAND to the transmitting modem 120. The altered signals SAND of the transmitting modem 120, i.e., the signals with the unnecessary data removed are subjected to a CRC error checking by the CRC checking section 322 (step 450 of FIG. 8). If signals with a CRC error contained are transmitted to the central processing unit 323, then the central processing unit 323 judges that there has occurred an error, and outputs a driving signal to the alarming device 360 (step 460 of FIG. 8). The alarming device 360 is driven by the driving signal of the micro-computer 320, with the result that the optical alarming device 362 such as a light emitting diode is activated, or that the audio alarming device 364 such as a buzzer or a speaker is activated, thereby making the completion of the removal of the unnecessary data known.

Meanwhile, if the altered signals, i.e., the signals with a CRC error are transmitted to the television receiving device 200, the receiving device operates in the same manner as that of the conventional one thereafter. That is, the television receiving device first checks the CRC error, and thus, if there is a CRC error, the received data are not processed. At the same time, an address change command is ignored, with the result that the unnecessary data is removed. For example, the protocol is assumed to be as follows. That is, in the cable television receiving device 200, the data following the mentioned command is 100, and CRC is 900. The sum addition of these two numbers is 1000, and this is the normal recognition. Then the data following the mentioned command is processed. In this case, if the mentioned command is an unnecessary data, the data following the mentioned command is altered to 899 or 901, so that a figure other than 900 would be inputted. Therefore, the resultant value is 999 or 1001, and therefore, the receiving device ignores it.

Thus, in the present invention, if an unnecessary data is contained in a command, then a CRC error is forcibly generated, so that the receiving device can ignore a data stream containing an unnecessary data, thereby removing unnecessary data.

According to the present invention as described above, in a television receiving device capable of carrying out data communications, if an unnecessary data such as an address change command is contained in the data stream transmitted from the transmitting device to the receiving device, the unnecessary data is removed in advance. In this manner, the damages to the software or hardware of the receiving device can be prevented.

The above descriptions are made based on the preferred embodiment of the present invention, and various changes and modifications can be added to the described embodiment without departing from the scope of the present invention. Therefore, it is apparent that those ordinarily skilled in the art should know that the present invention is not limited to the above described embodiment.

What is claimed is:

1. In an for removing unnecessary data in a communication network having a transmitting device of a broadcasting station including a data outputting device for outputting broadcasting signals, and a transmitting modem for modulating the broadcasting signals so as to output the modulated signals as a data stream to a transmission line; a network amplifier on said transmission line for amplifying the signals of said transmitting device of said broadcasting station into a data stream; and a cable television receiving device including a receiving end modem for demodulating the signals received through said network amplifier, and a receiving device for processing the demodulated signals into television signals, the improvements comprising:

a demodulating modem for demodulating the data stream of said network amplifier;

a microcomputer checking commands and data of the data stream of said transmitting modem so as to output a jam control signal upon encountering unnecessary data, re-issuing another jam control signal after issuing the first jam control signal upon encountering a non-removal of the unnecessary data, and repeating the checking of commands and data of a next data stream of said transmitting modem upon finding a removal of the unnecessary data;

a wave form generator for generating clock signals of a certain frequency;

a first logic arithmetic section logic-summing the jam control signal of said micro-computer and the clock signals of said wave form generator; and a second logic arithmetic section for logic-multiplying an output of said logic arithmetic section by an output of said data outputting device of said transmitting device of a broadcasting station.

2. The apparatus as claimed in claim 1, wherein said micro-computer outputs an alarm driving signal upon removal of an unnecessary data, and further comprising an alarming device activated by the alarm driving signal of said micro-computer, for alarming a completion of removal of an unnecessary data.

3. The apparatus as claimed in claim 1, wherein said first logic arithmetic section consists of an OR gate.

4. The apparatus as claimed in claim 1, wherein said second logic arithmetic section consists of an AND gate.

5. The apparatus as claimed in claim 1, wherein signals from said wave form generator have a frequency higher than that of output signals of said data outputting device of said transmitting device of a broadcasting station.

6. The apparatus as claimed in claim 1, wherein said micro-computer comprises:

a data latching section for latching and outputting a data from said demodulating modem to a CRC checking section and to a central processing unit;

said CRC checking section checking an existence of a CRC error based on a data of said data latching section, and then, transmitting the checked result to said central processing unit;

a program memory for storing a system managing program and an unnecessary data removing program;

a user memory for storing a data needed during an execution of the program and a data generated during an execution of the program;

a clock generating section for generating clocks to supply them to said central processing unit;

said central processing unit executing the programs stored in said program memory so as to judge as to a presence or absence of an unnecessary data in accordance with comments and data of said data latching section, then issuing a jam control signal upon finding a presence of an unnecessary data, then judging as to whether the unnecessary data has been removed in accordance with a result of a CRC error checking, and then outputting an alarm driving signal to an external I/O driving port upon finding the removal; and said external I/O driving port supplying the alarm driving signal of said central processing unit to an external alarming device.

7. The apparatus as claimed in claim 2, wherein said alarming device consists of an optical alarming device.

8. The apparatus as claimed in claim 2, wherein said alarming device consists of an audio alarming device.

9. The apparatus as claimed in claim 5, wherein the signals from said wave form generator have a frequency twice as high as that of the output signals of said data outputting device of said transmitting device of a broadcasting station.

10. The apparatus as claimed in claim 6, wherein said program memory consists of a ROM.

11. The apparatus as claimed in claim 6, wherein said program memory consists of a RAM.

12. The apparatus as claimed in claim 7, wherein said optical alarming device consists of a lamp or a light emitting diode (LED).

13. The apparatus as claimed in claim 7, wherein said audio alarming device consists of a buzzer or a speaker.

14. The apparatus as claimed in claim 2, wherein said micro-computer comprises:

a data latching section for latching and outputting a data from said demodulating modem to a CRC checking section and to a central processing unit;

said CRC checking section checking an existence of a CRC error based on a data of said data latching section, and then, transmitting the checked result to said central processing unit;

a program memory for storing a system managing program and an unnecessary data removing program;

a user memory for storing a data needed during an execution of the program and a data generated during an execution of the program;

a clock generating section for generating clocks to supply them to said central processing unit;

said central processing unit executing the programs stored in said program memory so as to judge as to a presence or absence of an unnecessary data in accordance with comments and data of said data latching section, then issuing a jam control signal upon finding a presence of an unnecessary data, then judging as to whether the unnecessary data has been removed in accordance with a result of a CRC error checking, and then outputting an alarm driving signal to an external I/O driving port upon finding the removal; and said external I/O driving port supplying the alarm driving signal of said central processing unit to an external alarming device.

* * * * *